July 22, 1941.  E. ARON  2,250,321
VEHICLE LIFTING AND VIBRATING DEVICE
Filed Feb. 12, 1940  3 Sheets-Sheet 1
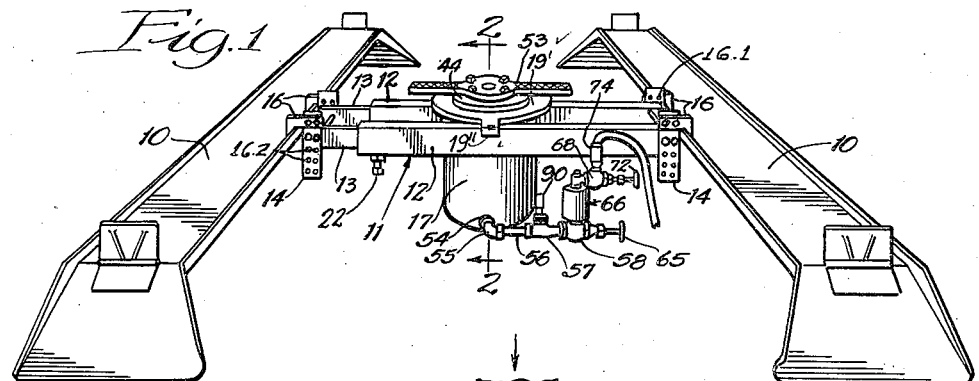
Inventor:
Edmund Aron,
By Soans, Pond & Anderson,
Attorneys.

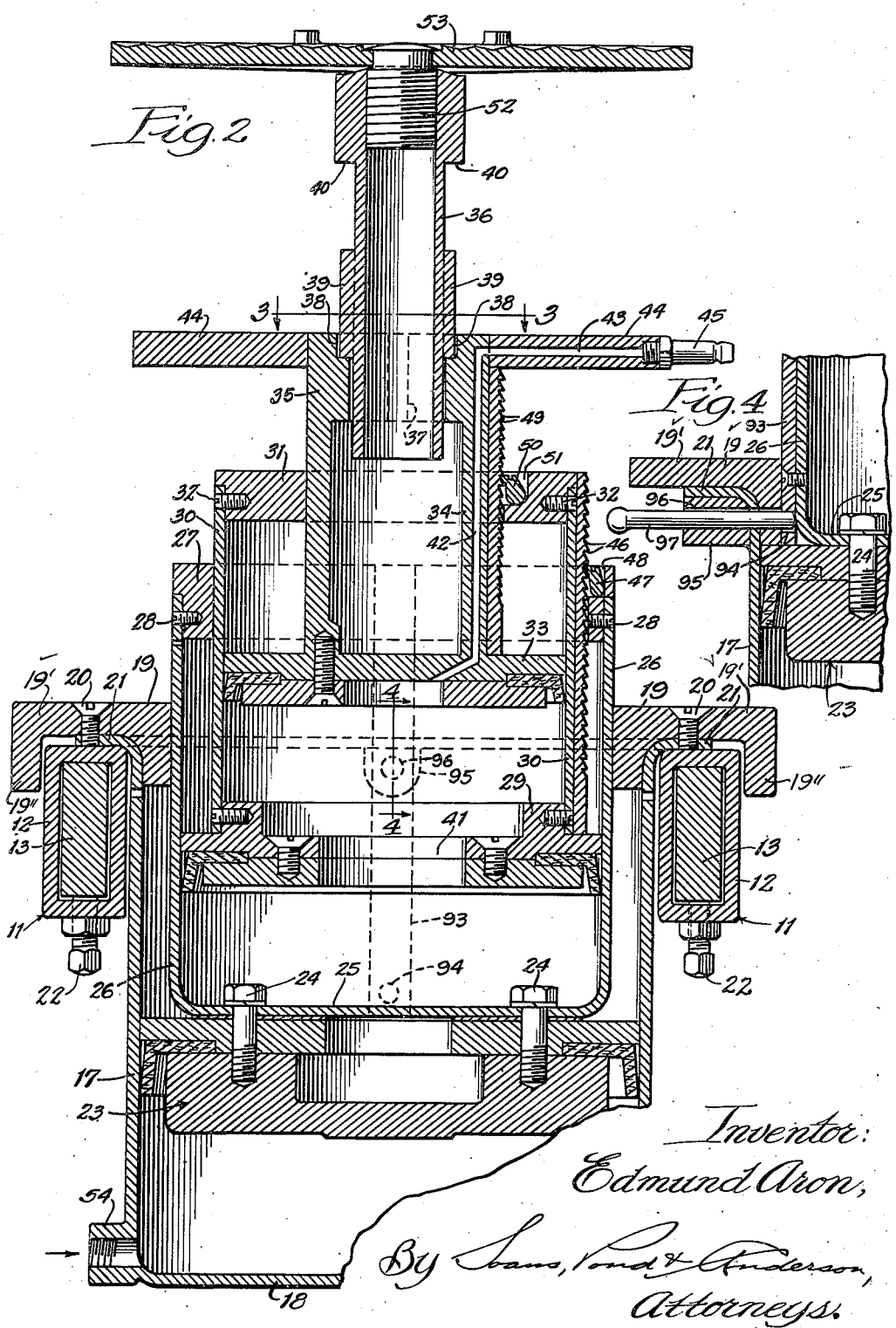

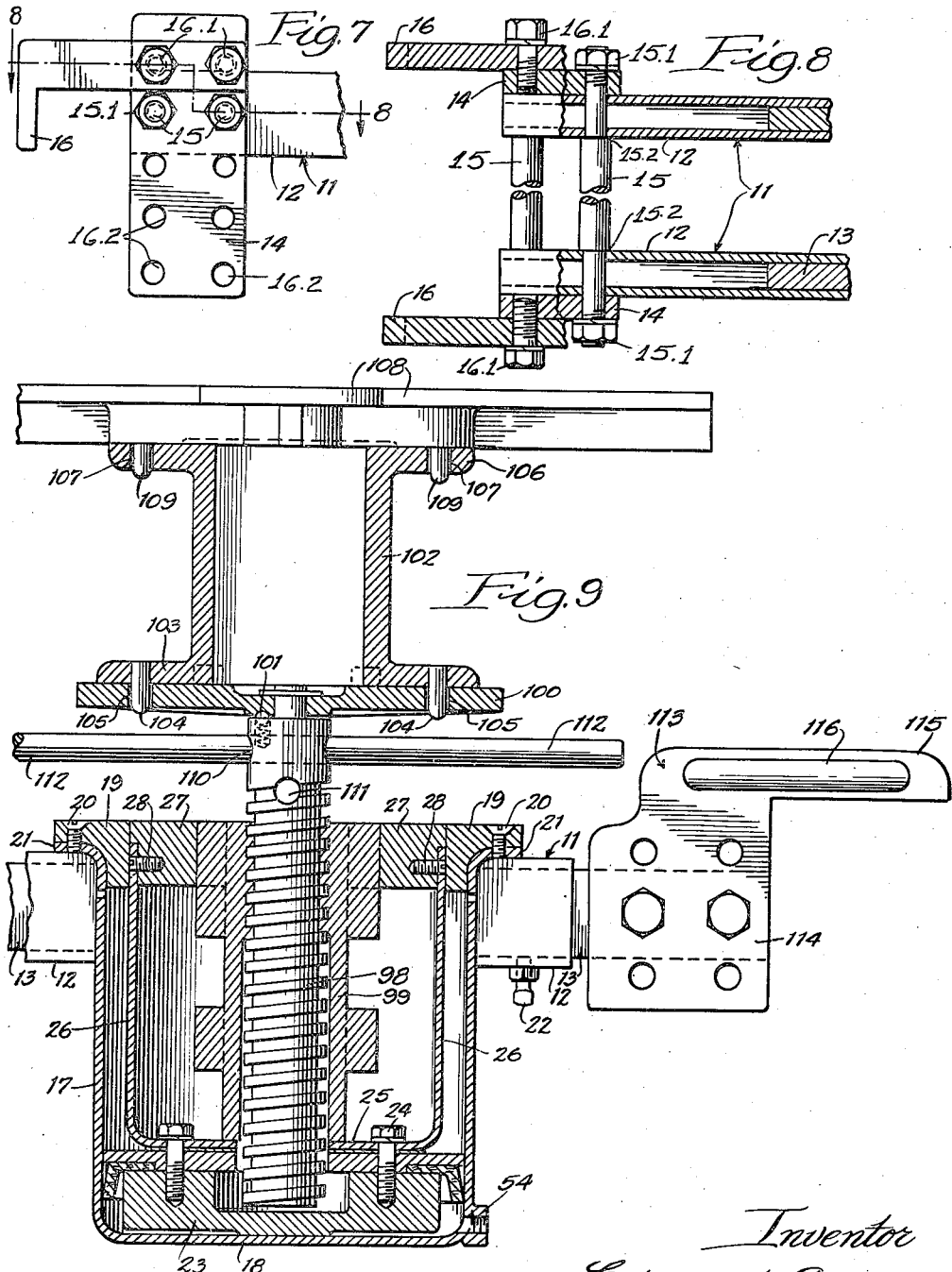

Patented July 22, 1941

2,250,321

UNITED STATES PATENT OFFICE 2,250,321

VEHICLE LIFTING AND VIBRATING DEVICE

Edmund Aron, Chicago, Ill., assignor to Moto-Sway Corporation of America, Chicago, Ill., a corporation of Illinois Application February 12, 1940, Serial No. 318,389

6 Claims. (Cl. 254—89)

This invention relates to a class of devices extensively used in effecting the lubrication of automobiles and other vehicles.

In the greasing of automobiles, three well-known methods have long been in use for placing the vehicle in a position in which those parts requiring attention will be readily accessible to the workmen.

In one method known as the pit method, the automobile is driven over a ground pit so as to permit a workman standing inside of the pit to reach the parts which are to be greased. Such pits are usually provided with a pair of tracks or runways over which the vehicle wheels are driven.

In the second method, a so-called drive-on lift is employed. This drive-on lift comprises a vertically movable plunger which supports a pair of tracks or runways on which the vehicle is driven and secured so that, when the plunger is elevated, the entire vehicle is raised to an overhead position to enable a workman standing on the floor to have access to the desired parts of the vehicle. In the use of the so-called drive-on lift, the four wheels of the vehicle are at all times in contact with the supporting tracks or runways and, in this position of the wheels, the wheels cannot be removed for greasing purposes.

The third method commonly employed involves the use of what is well-known in the trade as a free-wheel lift. This comprises a vertically movable plunger which supports a pair of cross bars or other suitable framework which is adapted to engage the axles of the vehicle, but not the wheels, so that when the plunger is elevated the vehicle is raised to an overhead position while the four wheels thereof are free to rotate so that any one or all of the wheels may be freely removed for greasing purposes or tire changes.

The main objects of this invention are to provide an improved vehicle lifting and vibrating device which is equally adapted for use in connection with pits, drive-on lifts, and free-wheel lifts; to provide improved bridge means for suspending the vibrating device from the tracks or runways of a pit or drive-on lift; to provide a device of this kind which may be used either as a plain lift or jack for the purpose of elevating any part of the vehicle body or as a vibrator for imparting the desired vibratory motion to the vehicle for greasing purposes; to provide a vehicle lifting jack capable of large variations in effective height; to provide improved supporting means for the jack which will enable the jack to be readily shifted laterally and longitudinally of the vehicle for application of the jack to any portion of the vehicle under structure; to provide improved jack supporting means of this kind which will prevent any spreading of the bars which support the jack and will permit the jack to be readily removed from the greasing device when it is to be used as a single lifting jack; and to provide an improved combination lifting jack and vehicle vibrator of this kind which is sturdy in construction and efficient in operation.

Illustrative embodiments of this invention are shown in the accompanying drawings, wherein:

Fig. 1 is an end perspective view of a pair of trackways, showing my improved lifting and vibrating device mounted thereon.

Fig. 2 is an enlarged vertical axial section through the lifting device or jack, viewed on line 2—2 of Fig. 1.

Fig. 3 is a sectional detail taken on the line 3—3 of Fig. 2.

Fig. 4 is a fragmentary section taken on the line 4—4 of Fig. 2, illustrating a manually operated lock for holding the jack in fully raised position.

Fig. 5 is a vertical section through a device by which the jack may be optionally operated either as a vibrator or a straight lifting jack.

Fig. 6 is a transverse section, taken on the line 6—6 of Fig. 5.

Fig. 7 is an enlarged fragmentary side elevation of a bridge member that spans the space between the trackways, and is adjustable both vertically and horizontally.

Fig. 8 is a plan section taken on the line 8—8 of Fig. 7.

Fig. 9 is a vertical axial section through a modified form of jack employing a screw actuated adjustment for varying the effective height of the jack.

Referring first to Figs. 1, 7 and 8, 10 designates each of a pair of trackways for supporting an automobile or other vehicle for purposes of lubrication. These trackways may be mounted on the sides of a pit or they may be a part of a "drive-on" lift. Supported on and extending between adjacent inner edges of the trackways 10 is a bridge member designated as an entirety by 11, which constitutes a support for the lifting and vibrating jack. This bridge member 11 is adjustable both lengthwise and vertically. This bridge member comprises two parallel bars each consisting of outer and inner telescoping sections 12 and 13, respectively. These are also shown in cross-section in Fig. 2. To connect and support the ends of these bars 11 at varying heights, I employ at each end a rack comprising spaced vertical plates 14 which are bolted to the bars 12 by bolts 15 and nuts 15.1. The bolts 15 are provided with annular shoulders 15.2 engaging the inner faces of the bars 12 to properly space the bars from each other.

Adjustably mounted on each of the plates 14, is a hanger 16, which is adjustably secured to the plate by a pair of screws 16.1 adapted to engage any one of the pairs of threaded apertures 16.2 in the plate, thereby permitting vertical adjustment of the hangers for raising and lowering the bridge.

The preferred form of pneumatic jack here employed is shown in vertical axial section in Fig. 2. It is of the telescopic type and preferably is constructed as follows.

17 designates the cylinder or shell, and 18 the bottom wall of the lowest member. 19 designates the annular top wall of this lowest member, continuous with the upper portion of which is a lateral flange 19' that overlies and is supported by the bars of the bridge 11. The flange 19' is secured by machine screws 20 to a horizontal annular flange 21 on the upper edge of the cylinder 17. This flange 21 rests directly upon and is suspended from the outer telescoping members 12 of the supporting bars 11; the outer and inner bars 12 and 13 being locked in adjusted position by clamp screws 22. The lateral flange 19' has on its outer edge a pair of diametrically opposed depending hooks 19", best shown in Figs. 1 and 2, that overlap the outer sides of the bridge bars and prevent spreading of said bars under any sidewise shift of the jack toward either bar, in assemblies which may omit the tie bolts 15 or like means connecting and spacing the bridge bars. In this improved construction the jack may be freely slid along the members 12 for lateral adjustment, and it may be entirely removed by merely lifting it from the bridge when the jack is to be used alone. Vertically slidable within this lowest member of the jack is a piston 23, to the upper side of which is attached, as by machine screws 24, the bottom wall 25 of the next higher section of telescopic jack; said bottom wall being integral with a cylindrical wall 26 of less diameter than the cylindrical wall 17 of the lowest section. The cylindrical wall 26 extends upwardly through and in sliding contact with the central opening in the top wall 19 of the lowest section, and into its upper end is fitted a ring 27 attached as by machine screws 28.

Slidably engaged with the cylinder 26 of the intermediate section is a piston 29, to which is secured the lower end of the cylinder section 30 of the next higher telescopic section, this latter having fitted into its upper end a ring 31 secured in place by machine screws 32. Slidably engaged with the cylinder 30 is a third piston 33, to which is secured a cylinder 34, the wall of which is considerably thicker than that of the lower cylinders 30, 26 and 17. In the upper end of cylinder 34 is a ring 35 which, as shown, may be cast integral with the cylinder 34, and slidably fitting the ring 35 is a tube 36. As best shown in Fig. 3, in the upper end of the ring 35 are formed two vertical slots 37 located diametrically opposite each other, and extending entirely through the ring, and also two diametrically opposite shallow slots 38. On opposite sides of the tube 36 are two fins 39 which can either enter the shallow slots 38, as shown in Fig. 2 to support the tube 36 in a relatively high position, or can extend through the full length slots 37 to permit the tube 36 to occupy a lower position. In this lower position, the tube 36 is supported by an annular shoulder 40 on its upper end coming to rest on the top edge of cylinder wall 34.

It will be observed that the space in cylinder 30 below the piston 33 is in constant communication with the space in cylinder 26 below the piston 29 by a central opening 41 formed through the piston 29. Also, through the piston 33 and lengthwise of the cylinder wall 34 is a duct 42 which connects at its upper end with a radial duct 43 formed in a disc 44 mounted on the upper end of cylinder 34. Entered into the outer end of duct 43 is a nipple 45 containing an inwardly open check valve, said nipple adapted to have applied thereto a hose (not shown) conveying compressed air or other pressure fluid to the jack.

To the outer side of the cylinder 30 is attached a vertical rack bar 46 which cooperates with a pawl 47 seated in a pocket 48 in the top of the ring 27; and secured to the outer side of the cylinder 34 is a similar vertical rack 49 which cooperates with a pawl 50 seated in a pocket 51 in the ring 31. These pawls 47 and 50 act automatically to maintain the cylinders 30 and 34 at any heights to which they may be raised by the pressure fluid admitted through nipple 45. The telescoping members may be later collapsed by inserting a screw driver into kerfs formed in the top of the pawls to swing the pawls back out of engagement with their respective racks.

The upper end of the tube 36 is tapped, and inserted therein is a threaded plug 52 on the upper end of which is mounted a cross-bar or plate 53 that directly contacts with the bottom of the car body, or with an axle. The racks and pinions above described afford breathing holes for the annular spaces surrounding the cylinders 30 and 34.

Communicating with the lower end of the lowest jack section 17, is an internally threaded boss 54 adapted to receive an elbow 55 that communicates with a section of pipe 56 (Figs. 1 and 5), and threaded onto the outer end of pipe section 56 is a hollow fitting 57 constituting in effect an extension of pipe 56, and threaded onto the outer end of fitting 57 is a valve fitting 58 also constituting in effect an extension of pipe 56. In a transverse wall of the valve fitting 58 is a port 60 shaped to constitute a seat for a valve 61, the stem 62 of which has a threaded portion 63 engaged with an internally threaded portion of a valve stem fitting 64 that is screwed onto the outer end of the valve fitting 58; and on the outer end of valve stem 62 is a hand wheel 65 for opening and closing valve 61. Mounted on the upper side of valve fitting 58 is an automatically reciprocating valve structure designated as an entirety by 66, the upper end of which carries an elbow fitting 67, with which is connected another valve fitting 68, similar to the valve fitting 58, the port 69 of which is opened and closed by a valve 70 similar to the valve 61, and operated by a valve stem 71 and hand wheel 72. Mounted in the upper side of the valve fitting 68 is a coupling 73 that receives a compressed air hose 74. The reciprocating valve 66 is an old and known device and no claim thereto per se is made herein.

Briefly describing the structure of this valve, 75 designates the valve cylinder within which is slidably mounted a tubular valve body 76. Screwed into the upper end of the valve body 76 is the stem 77 of a conical valve head 78 that co-acts with a valve port 79 open to the fitting 67. Extending through the valve neck 77 is a longitudinal duct 80, formed with branches at its upper end opening through the valve head 78. Referring to Figs. 5 and 6, in the lower portion of the tubular valve body 76 is an annular groove 81, and communicating with said annular groove are four radial ducts 82 formed in the tubular valve body 76. Also, communicating with the annular groove 81 are four downwardly convergent ducts 83 extending through the bottom of the valve body 76. By reason of this structure, compressed air flowing downwardly through the port 79, depresses the valve body 76 and flows through duct 80, radial ducts 82, annular groove 81, convergent ducts 83, and the valve fitting 58. The annular groove 81, in the fully raised position of the valve shown in Fig. 5 registers with four radial exhaust ducts 84 formed in the valve cylinder 75. The lower end of valve cylinder 75 is connected into the top of the valve fitting 58 by a longitudinally ported threaded cap 85, and its upper end is connected to the lower end of the elbow fitting 67 by a similar ported threaded cap 86. Encircling this valve structure is a cylindrical casing 87 suspended from a cap 88 clamped between the elbow fitting 67 and the upper cap 86; and between the valve structure and its casing is a filling 89 of flocculent material which serves as a muffler. It will be observed that there are differential areas on the two ends of the valve, so that, with equal pressure above and below the valve, the latter will move upwardly.

Screwed into the top side of the fitting 57 is a nipple 90 containing a check valve 91 normally pressed to its seat by a spring 92, whereby air can flow downwardly through the nipple but is blocked against flow in the reverse direction. This nipple 90 and the nipple 45 may be of identical structure.

Describing the operation, to expand the jack into contact with the car, and assuming that the telescoping members of the jack are in their lowest or fully collapsed positions, compressed air is first turned on through nipple 45 which causes the member carrying piston 29 to rise, and by reason of the differential areas of pistons 29 and 33, at the same time causes the member carrying piston 33 to rise, and the rising movement of the latter raises tube 36 (which may be in its high or low position depending on the distance between the top of the jack and the car) until the top plate 53 comes into contact with the bottom of the car body or with a car axle. The two intermediate telescoping members are automatically held in their raised positions by the pawls 50 and 47. The hand valve 61 being then closed, compressed air is turned on through nipple 90, which raises all of telescoping members together. Since compressed air, especially when under a heavy load, tends to leak past the lowermost piston 23, I provide a simple mechanical lock for supporting said piston in its fully raised position. This is detailed in Fig. 4. To the outer side of cylinder 26 is attached a vertical strip 93, in the lower end of which is a hole 94. Welded or otherwise secured to the underside of the annular top wall 19 is a lug 95, and through this lug and the top portion of cylinder wall 26 is a hole 96. When the pressure below piston 23 has raised the latter to bring hole 96 into register with hole 94, a locking pin 97 is inserted through both holes, so that, even if the pressure below piston 23 should leak upwardly past the latter, the piston 23 will maintain the superposed parts of the jack and the load in fully raised position.

To operate the mechanism as a vibrator instead of as a mere lifting jack, the operator transfers the air hose from nipple 90 to coupling 73 (or closes a valve in the hose on nipple 90 and opens a similar valve in hose 74, if two separate hose are used), and then opens both hand valves 70 and 61, having previously retracted the locking pin 97. The built up pressure beneath piston 23 reacts on the lower end of valve 76 and raises it to the position shown in Fig. 5, so that the air beneath piston 23 is exhausted through ports 83, channel 81 and exhaust ports 84. This lowers the pressure on the lower end of valve 76 below the pressure on its upper end, so that the valve descends, cutting off the exhaust through ports 84, and the pressure by flowing beneath piston 23 raises the latter and its load until the pressure in the jack again builds up to a pressure equaling the inflowing pressure, whereupon the valve again rises to permit exhaust. This cycle is repeated with comparative rapidity producing a shimmying or vibrating movement on the load, which, as before stated, effectively distributes and spreads the applied grease.

Fig. 9 shows a modification of the jack, which retains the lower two pneumatically operated load lifting cylinders 17 and 26, the former having the bottom and top members 18 and 19, and the latter the piston 23 and top ring 27, as in the construction shown in Fig. 2. The upper two cylinders 30 and 34, their pistons and the air supply served by nozzle 45, and their pawl and rack locking devices, constituting the height-adjusting members of the jack of Fig. 2, are however omitted, and replaced by a single long screw 98 that is engaged with the threaded upper end portion of a fixed upright 99 stepped on the bottom wall 25 of cylinder 26 and at its upper end fitted into and interlocked (against rotation) with the top ring 27. The tube 36 of Fig. 2 is replaced by a frame structure comprising a lower plate 100 swiveled on the upper end of screw 98 and yieldably locked against rotation by a spring-pressed ball 101, an intermediate pedestal 102 having a base flange 103 carrying dowels 104 engaged with holes 105 in plate 100 and having a top flange 106 formed with holes 107, and a horizontal car-engaging spider 108 carrying dowels 109 engaged with the holes 107. In the upper end of screw 98 are transverse holes 110 and 111, through either of which is passed a handle bar 112 for operating the screw 98 to raise the spider 108 into contact with the bottom or an axle of the car body. When this has been done, air is turned on into the space beneath piston 23 from nipple 90 to first raise the load and permit the application of grease or oil, and this may be followed by air admitted through the reciprocating valve 66 to shimmy the car body up and down and distribute and spread the oil or grease, all as above described in connection with Figs. 2, 5 and 6.

For use on trackways which may omit the upstanding flanges on their inner edges, I prefer to employ bar end extensions to overlap the trackways such as are shown in Fig. 9; the same comprising plain rectangular brackets designated as a whole by 113, the vertical limb 114 of each bracket having the function of the vertical rack plate 14 of Fig. 1, and the horizontal limb 115, which is integral with the vertical limb 114, taking the place of the hook 16 of Fig. 1, and resting on and crosswise of the trackway. The horizontal limb 115 is preferably reinforced and stiffened by a longitudinal rib 116 on either or both sides thereof.

From the foregoing description it will be apparent that this improved jack may be used as a single jack for lifting purposes or as a vibrator for vibrating a vehicle.

From an examination of Figs. 1, 2 and 9, it will be seen that the bottom wall 18 of the jack is flat so that when the jack is lifted out of the supporting bridge it may be placed on the floor or ground so as to be supported on its flat bottom 18 without the use of any other supporting structure. The jack is thereby readily portable so that it may be conveniently used as a lifting jack.

It will also be seen that when the device is used as a vibrator the jack has a great variety of possible adjustments. The sliding connection between the jack and the bars 12 permits the jack to be moved laterally so as to be adapted to engage any portion of the under-structure of the vehicle. The sliding connection between the bridge and the runways also permits the entire bridge and jack to be moved longitudinally of the vehicle.

From an examination of Fig. 1, it will be seen that the jack extends both above and below the supporting bridge which increases the stability of the device.

Although but certain specific embodiments of this invention have been herein shown and described, it will be understood that details of the construction shown may be altered without departing from the spirit of the invention as defined by the following claims.

I claim:

1. In a device of the character described, a bridge structure comprising parallel bars adapted to span the space between parallel trackways and at their ends slidably rest on said trackways, in combination with a jack formed between its ends with a lateral flange overlying and supported by the bars of said bridge, said flange having on its outer edge a pair of diametrically opposed depending hooks overlapping the outer sides of said bars and preventing spreading of said bars under sidewise shift of the jack toward either bar, said jack being laterally movable lengthwise of said bridge and its lower portion being suspended by said flange between and below said bars, said jack being removable by merely lifting it from said bridge.

2. In a device of the class described, a bridge structure comprising parallel bars adapted to span the space between parallel trackways, tie bolts extending between and through the end portions of said bars and having threaded ends beyond the outer sides of said bars and annular shoulders engaged with the inner sides of said bars, clamp nuts on said threaded ends, vertically adjustable members attached to and crosswise of the ends of said bars, and hangers attached to said vertically adjustable members and overlapping said trackways, by which the height of said bars may be varied, in combination with a jack slidably suspended from and between said bars and laterally movable lengthwise of the latter toward and from either trackway.

3. In a device of the class described, a bridge adapted to span the space between parallel trackways, and comprising parallel horizontal bridge bars spaced laterally sufficiently to admit a jack between them, racks each consisting of laterally spaced vertical plates disposed crosswise of the outer sides of corresponding ends of said bridge bars and horizontal bolts extending through and connecting both said bridge bars and plates, said bolts formed with annular shoulders bearing on the inner sides of said bridge bars, and hangers rigidly attached to the vertical plates of each rack and adapted to overlie and rest on said trackways.

4. In a device of the class described, a bridge adapted to span the space between parallel trackways, and comprising racks each consisting of laterally spaced vertical plates, each having a pair of vertical rows of threaded holes, and horizontal bolts connecting and spacing said plates, parallel horizontal bridge bars at their ends supported on said bolts and spaced laterally sufficiently to admit a jack between them, hangers adapted to overlie and rest on said trackways, and screws for rigidly attaching said hangers to said plates through engagement with any horizontal pair of said threaded holes, whereby the height of said bridge bars relatively to said trackways may be varied.

5. An embodiment of the structure defined in claim 1, wherein each of the parallel bridge bars consists of telescoping members, one completely surrounding the other, permitting adjustment of the length of the bridge to fit different spacings of the trackways.

6. In a device of the class described, a bridge structure comprising parallel bars adapted to span the space between parallel trackways and at their ends slidably rest on said trackways, in combination with a jack having a pair of diametrically opposed laterally extending members adapted to rest on, and hook over the outer sides of, said bars and prevent spreading of said bars under sidewise shift of the jack toward either bar, said jack being laterally movable lengthwise of said bridge and its lower portion being suspended by said members between and below said bars, said jack being removable by merely lifting it from said bridge.

EDMUND ARON.